(12) United States Patent
Vincent et al.

(10) Patent No.: US 6,338,607 B1
(45) Date of Patent: Jan. 15, 2002

(54) PALLET AND TOP FRAME HANDLER FOR A PALLETIZER

(75) Inventors: Patris E. Vincent, Madison; Brian E. Busse, Randolph, both of WI (US)

(73) Assignee: Arrowhead Systems LLC, Randolph, WI (US)

( * ) Notice: Subject to any disclaimer, the term of this patent is extended or adjusted under 35 U.S.C. 154(b) by 0 days.

(21) Appl. No.: 09/180,170

(22) PCT Filed: May 2, 1997

(86) PCT No.: PCT/US97/07571

§ 371 Date: Jan. 19, 1999

§ 102(e) Date: Jan. 19, 1999

(87) PCT Pub. No.: WO97/42115

PCT Pub. Date: Nov. 13, 1997

Related U.S. Application Data

(60) Provisional application No. 60/016,853, filed on May 3, 1996, provisional application No. 60/017,014, filed on May 3, 1996, and provisional application No. 60/016,845, filed on May 3, 1996.

(51) Int. Cl.$^7$ ............................................. B65G 59/02
(52) U.S. Cl. ........................ 414/796.5; 414/789.9; 414/799; 414/927
(58) Field of Search ............................ 414/799, 791.7, 414/927, 789.5, 789.9, 794.6, 796.5; 271/91

(56) References Cited

U.S. PATENT DOCUMENTS

| | | | |
|---|---|---|---|
| 2,732,957 A | | 1/1956 | Horner ........................... 214/6 |
| 3,219,203 A | | 11/1965 | Jeremiah ....................... 214/6 |
| 3,522,890 A | | 8/1970 | Birchall ......................... 214/6 |
| 3,757,971 A | | 9/1973 | Frish ........................... 214/8.5 |
| 3,844,422 A | * | 10/1974 | Smith et al. ................ 214/6 P |
| 3,897,877 A | | 8/1975 | Vandermeer et al. .......... 214/6 |
| 3,934,713 A | * | 1/1976 | Van der Meer et al. ...... 198/34 |
| 4,082,194 A | * | 4/1978 | Sheehen ..................... 214/6 P |
| 4,172,686 A | * | 10/1979 | Shorthouse ................ 414/114 |
| 4,193,725 A | * | 3/1980 | Schiepe et al. .............. 414/83 |
| 4,439,097 A | * | 3/1984 | Mebus ........................ 414/42 |
| 4,508,483 A | | 4/1985 | Hessling et al. ............ 414/127 |
| 4,557,656 A | * | 12/1985 | Ouellette ..................... 414/43 |
| 4,978,275 A | * | 12/1990 | Reid et al. ............... 414/789.5 |
| 5,096,367 A | * | 3/1992 | Winski ....................... 414/786 |
| 5,163,808 A | * | 11/1992 | Tsubone et al. ......... 414/791.8 |
| 5,336,042 A | * | 8/1994 | Winski et al. ........... 414/789.5 |
| 5,372,472 A | * | 12/1994 | Winski et al. ............. 414/786 |
| 5,395,209 A | * | 3/1995 | Busse et al. ................ 414/799 |
| 5,791,865 A | * | 8/1998 | Bublitz ..................... 414/794.4 |
| 5,971,699 A | * | 10/1999 | Winski ..................... 414/792.6 |
| 6,100,706 A | * | 8/2000 | Hamiton et al. ............ 324/760 |

* cited by examiner

Primary Examiner—Joseph A. Fischetti
(74) Attorney, Agent, or Firm—Michael Best & Friedrich LLP

(57) ABSTRACT

A palletizer (10) for stacking a series of items on a pallet (P), the palletizer (10) including a pallet hoist (34) for supporting a stuck of pallets therein; a pallet lift mechanism (82) mounted for vertical movement within the pallet hoist (34) adjacent to and relative to the stack of pallets (P), the pallet lift assembly (82) including a pair of spaced, opposed pallet support members (110) mounted on the pallet lift assembly (82) for movement between a retracted position wherein there is clearance between the pallet support member (110) and the stack of pallets, and an extended position wherein the pallet support member (110) is in an interference position relative to the stack of pallets; a top frame dispenser (38) for supporting a supply of top frames (T); and a carriage for moving pallets and top frames from the pallet hoist (34) and the top frame dispenser (38), respectively.

9 Claims, 12 Drawing Sheets

PALLET AND TOP FRAME HANDLER FOR A PALLETIZER

RELATED APPLICATIONS

This application claims the benefit under 35 U.S.C. §119 of co-pending U.S. Provisional Patent Application Ser. Nos. 60/016,853; 60/017,014; and 60/016,845, all filed May 3, 1996.

BACKGROUND OF THE INVENTION

1. Technical Field

The invention relates generally to material handling systems, and particularly to palletizers for arranging articles on a pallet.

2. Related Prior Art

A palletizer is operable to arrange objects, such as beverage containers, into an organized pattern and place the objects onto a pallet. It is known to provide such palletizers with a container conveyor assembly, apparatus to organize the objects into a pattern, a pallet dispenser, a separator sheet dispenser and a main hoist for holding the pallet in a position to receive a layer of objects and to move the pallet and layers of objects so as to receive an additional layer of objects.

SUMMARY OF THE INVENTION

The invention provides a palletizer assembly having improved apparatus for handling pallets upon which objects are placed and for handling top frames which are placed on top of the uppermost tier of a stack of layers of objects. The pallet and top frame handling apparatus include improvements to the pallet hoist and the main hoist. The palletizer, including the pallet and top frame handler, incorporates a modular design permitting various features of the invention to be independently incorporated into the palletizer.

The invention simplifies operation of the palletizer assembly, thereby improving the service life of the palletizer and simplifying maintenance and manufacturability of the palletizer assembly.

More particularly, in one embodiment of the invention, the palletizer assembly includes a pallet dispenser and a pallet hoist. The pallet hoist lifts individual pallets into an elevated, staging position wherein the pallet is received by a top frame handler. The staging position is in close proximity to the top of the main hoist so that the pallet need travel only a minimal distance to an initialized position wherein the pallet is located in the main hoist and positioned to receive a first layer of objects.

The top frame handler moves a top frame from a stack of top frames to the staging position underneath a pallet in the staging position and subsequently transports the pallet and top frame into the main hoist. The movements of the pallets and top frames are coordinated by the pallet hoist and top frame handler so that movements of the pallet and top frame into the staging position occur during stacking of containers.

Upon completion of a stack of objects, the top frame handler moves into the main hoist, thereby positioning the pallet and top frame into position for stacking. Because the top frame, when in the staging position, is in close proximity to the top of the stack, the top frame is moved into position on top of a newly created stack of containers quickly.

The top frame handler then releases the top frame to drop onto the top tier of stack of layers of objects while the stack of containers is located within the main hoist.

The palletizer also includes a pallet lift located in the main frame shaft. At the time the top frame handler releases a top frame onto a newly created stack of layers of containers, the pallet lift in the main hoist removes the pallet from the top frame carrier and into the initialized position for receiving a first layer of objects. The pallet lift, which is mounted on the main hoist frame, also positions the pallet so as to be supported by the main hoist.

The palletizer thus provides apparatus for handling a pallet and a top frame in a manner which minimizes the distances the pallet and top frame must travel from respective storage positions into a stacked position with containers. When the pallet is in the staging position, the pallet is maintained in a position above a top frame immediately prior to introduction of the pallet and top frame into the main hoist. This placement of the pallet above the top frame prior to placement of the top frame on a stack of containers reduces the cycle time of the palletizer assembly.

Another advantage provided by the invention is the provision of a palletizer assembly that places a top frame on a stack of containers before the stack leaves the main hoist. Because the stack of containers is eventually moved laterally outside the confines of the main hoist, which can tend to cause tipping of the stack or disrupt the arrangement of the containers on the pallet, the placement of a top frame on the stack before such lateral movement occurs enhances the stability of the stack.

Other features and advantages of the invention will become apparent to those skilled in the art upon review of the following detailed description, claims and drawings.

Figure 1:
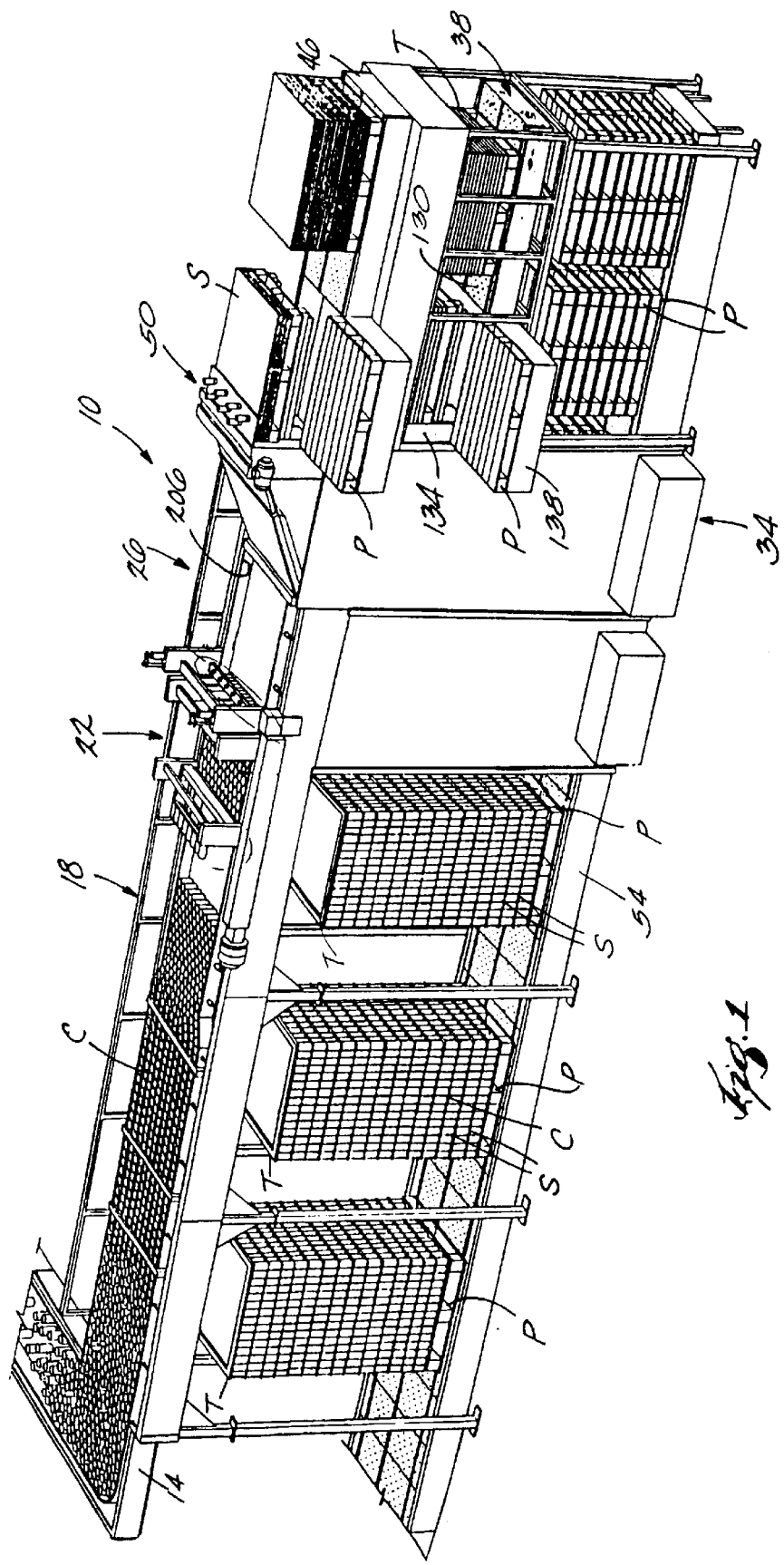
FIG. 1 is a perspective view of a palletizer embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

A palletizer assembly 10 embodying the invention is illustrated in the drawings. The palletizer 10 comprises (see FIG. 1) a container conveyor assembly 14, apparatus 18 for arranging containers (denoted generally by reference letter "C") received from the conveyor 14 into a pattern, apparatus 22 for sweeping a discrete number of containers from the pattern forming apparatus 18 into a layer of containers, a main hoist 26 for supporting a pallet (denoted generally by reference letter "P") in position to receive a layer of containers from the sweep apparatus 22.

The pallets are delivered to the main hoist 26 of the palletizer 10 by means of a pallet dispenser 30 which supports a supply of pallets. The palletizer assembly 10 also includes a pallet hoist 34 for receiving a stack of pallets from the pallet dispenser 30 and for lifting individual pallets upwardly.

The palletizer assembly 10 also includes a top frame dispenser 38 which supports a supply of top frames (denoted generally by reference letter "T") on a pallet. The palletizer assembly 10 also includes a top frame handler assembly 42 (FIG. 2) for moving individual top frames from the top frame dispenser 38 into the main hoist 26 into a position on top of a completed stack of objects.

The sweep apparatus 22 and the top frame handler assembly 42 are further described in the following co-pending International (PCT) patent applications, which are assigned to the assignee hereof and which are incorporated herein by reference: Ser. No. 97925432.3, filed concurrently herewith and titled "Container Sweep Apparatus for a Palletizer"; and Ser. No. 97922645.3, filed concurrently herewith and titled "Separator Sheet Handler for a Palletizer".

The palletizer assembly 10 also includes a separator sheet dispenser 46 and a separator sheet handler assembly 50 for delivering individual sheets to the main hoist 26 for separating tiers of containers stacked on a pallet. A complete stack conveyor 54 is located at the bottom of the main hoist 26 for receiving a completed stack of containers comprising a pallet supporting multiple tiers of containers with separator sheets between the tiers of containers, and a top frame supported by the upper surface of the uppermost tier of containers.

Figure 2:
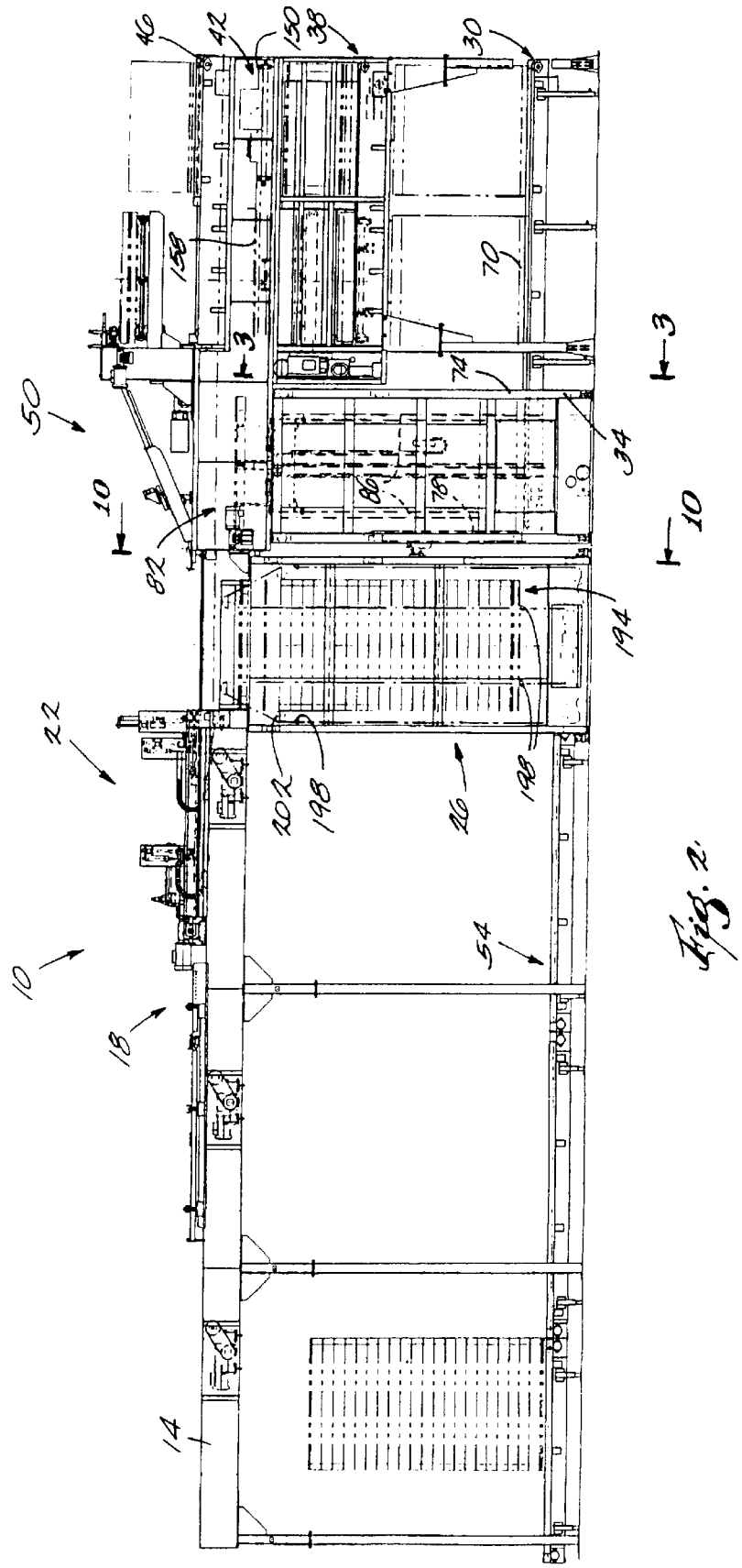
FIG. 2 is a side elevation view of the palletizer shown in FIG. 1.

More particularly, and with reference to FIG. 2, the pallet dispenser assembly 30 includes a pallet dispenser conveyor 70 for supporting a stack of pallets for use by the palletizer assembly 10. The pallet dispenser conveyor 70 delivers a stack of pallets to the pallet hoist 34 on an as needed basis.

Figure 3:
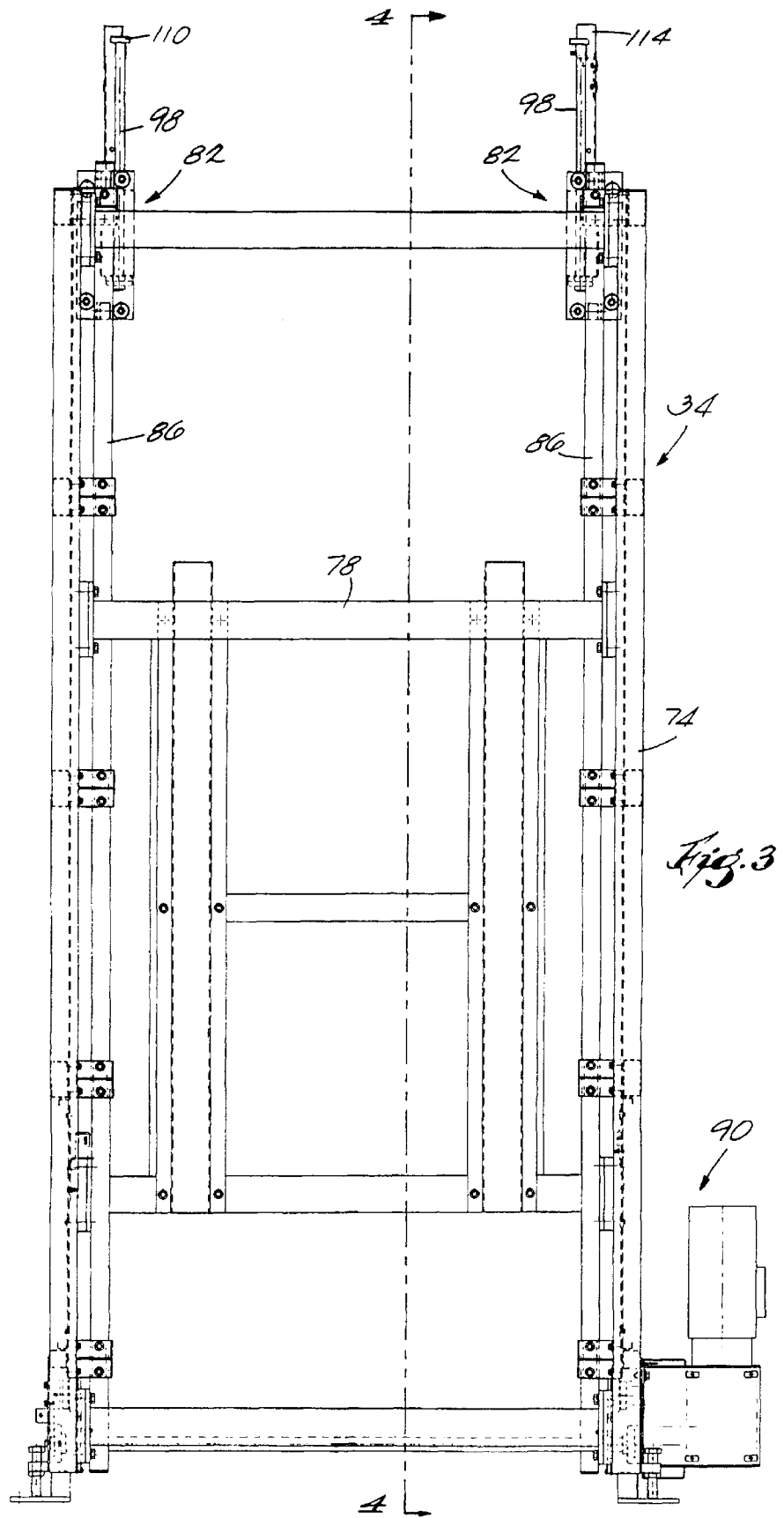
FIG. 3 is an elevation view of the pallet hoist taken generally along line 3—3 in FIG. 2.
Figure 4:
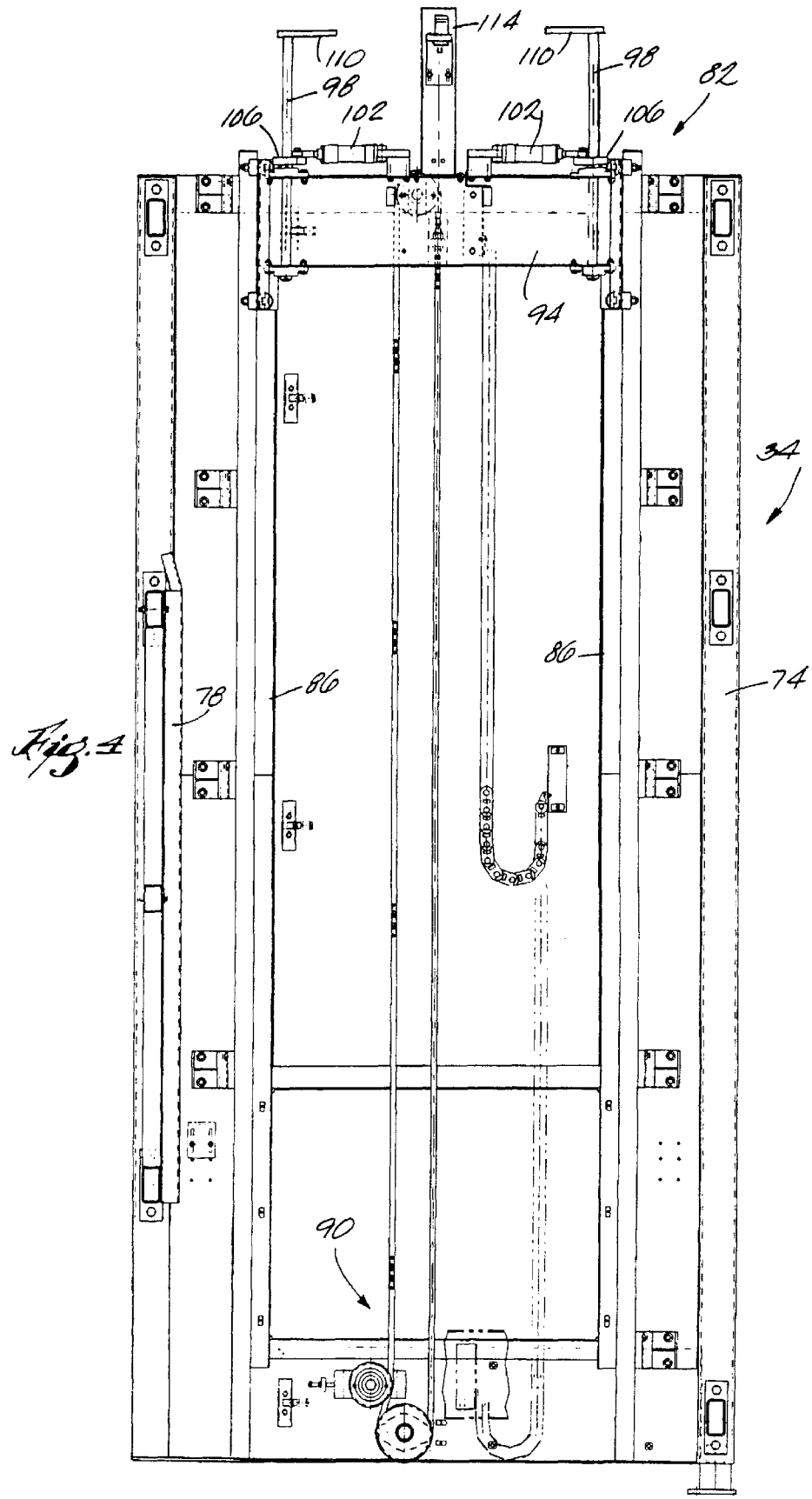
FIG. 4 is a sectional view taken along line 4—4 in FIG. 3.

As shown in FIGS. 2–4, the pallet hoist 34 includes a frame 74 and a backstop 78 fixed to one side of the frame 74. The backstop 78 prevents over-travel of stacks of pallets introduced into the frame 74 by the pallet dispenser conveyor 70. For reasons discussed below, the frame 74 includes two pairs of parallel, vertical rails 86 which extend upwardly through interior of the pallet hoist frame 74 and which are fixed to opposite sides of the frame 74.

Once a stack of pallets is delivered to the pallet hoist 34, the pallet hoist 34 is operable to move individual pallets from the stack of pallets upward into position to be carried by the top frame handler 42. More particularly, and with reference to FIGS. 3–6, the pallet hoist 34 includes a pair of pallet lift assemblies 82 which can be indexed from a position in the lower portion of the pallet hoist 34 adjacent the uppermost pallet in the stack of pallets in the pallet hoist 34 to a staging position (shown in FIGS. 3 and 4) wherein a pallet is held above the pallet hoist frame 74.

The pallet lift assemblies 82 are located in opposed facing relation on opposite sides of the pallet hoist frame 74. Each pallet lift assembly 82 is supported by a pair of the rails 86. A drive mechanism 90 associated with the pallet hoist 34 is operable to raise and lower the pallet lift assemblies 82 in tandem along the rails 86 between the lower region of the pallet hoist frame 74 and the staging position.

Each pallet lift assembly includes a subframe 94 which extends between and is supported by a pair of the vertical rails 86. Each pallet lift assembly 82 also includes a pair of pallet support members or arms 98 which are pivotably mounted on, and extend upwardly from, the subframe 94. Each arm 98 is located adjacent a respective rail 86 and extends upwardly from a respective end of the subframe 94. The arms 98 are supported by the subframe for pivotable movement about their longitudinal axis through a range of at least 90 degrees. As shown in FIGS. 3 and 4, when the pallet lift assemblies 82 are in the staging position, the subframe 94 is adjacent the uppermost extent of the pallet hoist frame 74 and the arms 98 extend above the uppermost extent of the pallet hoist frame 74.

Figure 5:
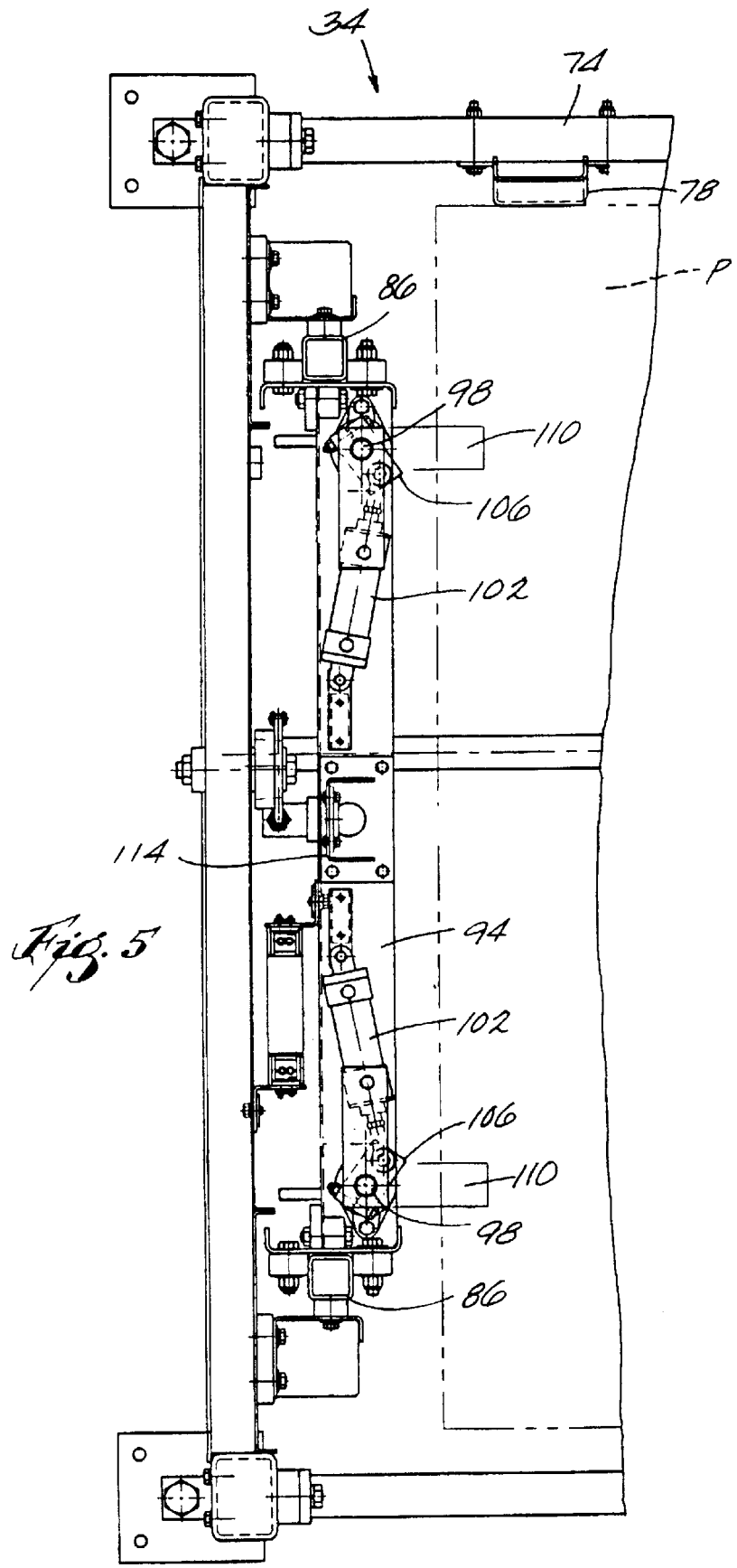
FIG. 5 is a an enlarged top view of a portion of the pallet hoist shown in FIG. 4 and showing a pallet in phantom.
Figure 6:
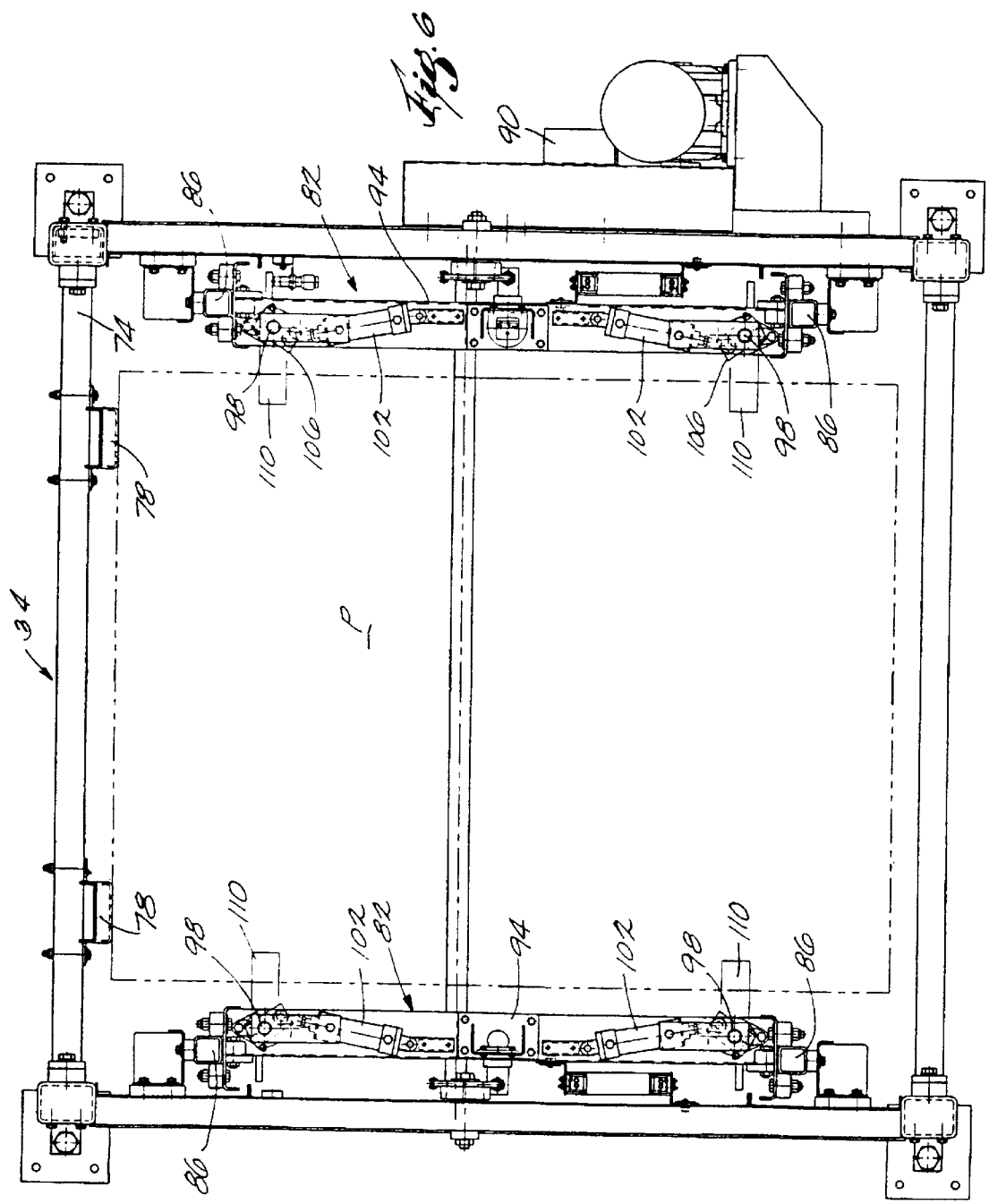
FIG. 6 is a top view of the pallet hoist shown in FIG. 5 showing a pallet in phantom.

Each pallet lift assembly 82 also includes a pair of actuators 102 mounted on the upper surface of the subframe 94. The actuators 102 have respective ends fixed to the subframe 94 and piston rods which are connected to a respective crank arm 106 fixed to a respective arm 98. The crank arms 106 are operably connected to respective actuators 102 such that extension and retraction of the actuators 102 rotates the arms 98 through a range of movement of approximately 90 degrees. Each extended arm 98 includes at the distal end thereof, an elongated finger 110 which extends radially relative to the axis of the extended arms 98. The fingers 110 are oriented relative to the extended arms 98, the frame 74, and to each other, such that when the actuators 102 are retracted, the fingers are in a retracted position (shown in FIGS. 3 and 4) such that the fingers 110 are generally parallel to the subframe 94. When the actuators 102 are extended as shown in FIG. 5, the arms 98 are rotated 90 degrees from the retracted position so that the fingers 110 are parallel and perpendicular to the subframe 94. When fingers 110 are so rotated into an extended position, the fingers 110 extend into the space above the pallet hoist frame 74 so that they are in an interference position relative to the stack of pallets.

The pallet hoist 34 also includes a pallet position sensor assembly 114 supported by one of the pallet lift assemblies 82 to provide a control signal to the drive 90 indicating the arrival of the pallet lift assemblies 82 to the position adjacent a pallet to be lifted. The position sensor assembly 114 is supported by the subframe 94 and holds a sensor (not shown) in position to detect the location of a lifting surface on a pallet relative to the fingers 110.

As mentioned above, the pallet hoist 34 is operable to move individual pallets from a stack of pallets located in the lower region of the pallet hoist frame 74 to the staging position located above the pallet hoist frame 74. Such raising of the individual pallets is accomplished as follows:

The pallet lift assemblies 82 are moved downwardly along the vertical rails 86 to a position adjacent the uppermost pallet in the stack of pallets. When the pallet lift assemblies 82 are so positioned, the actuators 102 and fingers 110 are retracted and move into a clearance on either side of the individual pallet to be lifted. Upon registration of the fingers 110 relative to the undersurface of the pallet, the pallet position sensor 114, at the level of the fingers 110, sends a signal to the drive mechanism 90 to stop downward movement of the subframe 94.

The actuators 102 are then extended thereby moving the fingers 110 into the extended position and into engagement with the undersurface of the uppermost pallet, i.e., the interference position relative to the stack of pallets. The drive 90 then raises the assemblies 82 and the pallet supported thereby along the vertical rails 86 to the staging position. Once in the staging position (see FIG. 7), the lower surface of the pallet is spaced above the upper extent of the pallet hoist frame 74 and is held in position to be received by the top frame handler 42 in a manner discussed below.

In general, the pallet is released by the lift assemblies 82 through the rotation of the fingers 110 into their retracted positions, thereby dropping the pallet supported thereby onto the upper surface of the top frame handler 42. The pallet lift assemblies 82 are then indexed downwardly into registration with the next uppermost pallet and the stack of pallets for subsequent cycling of the pallet hoist 34 to lift the next uppermost pallet to the staging position.

Referring to FIGS. 1 and 2, the top frame handler assembly 42 includes a top frame dispenser conveyor 130 (FIG. 1 only) for receiving a pallet supporting a stack of top frames. The top frame dispenser conveyor 130 is operable to move the pallet and the stack of top frames supported thereby into position on a top frame dispenser lift assembly 134. The top frame dispenser 38 also includes a top frame pallet discharge conveyor (not shown) and stage 138 for moving an empty pallet from the top frame dispenser lift assembly 134 into a position for retrieval by, for example, a forklift.

Figure 8:
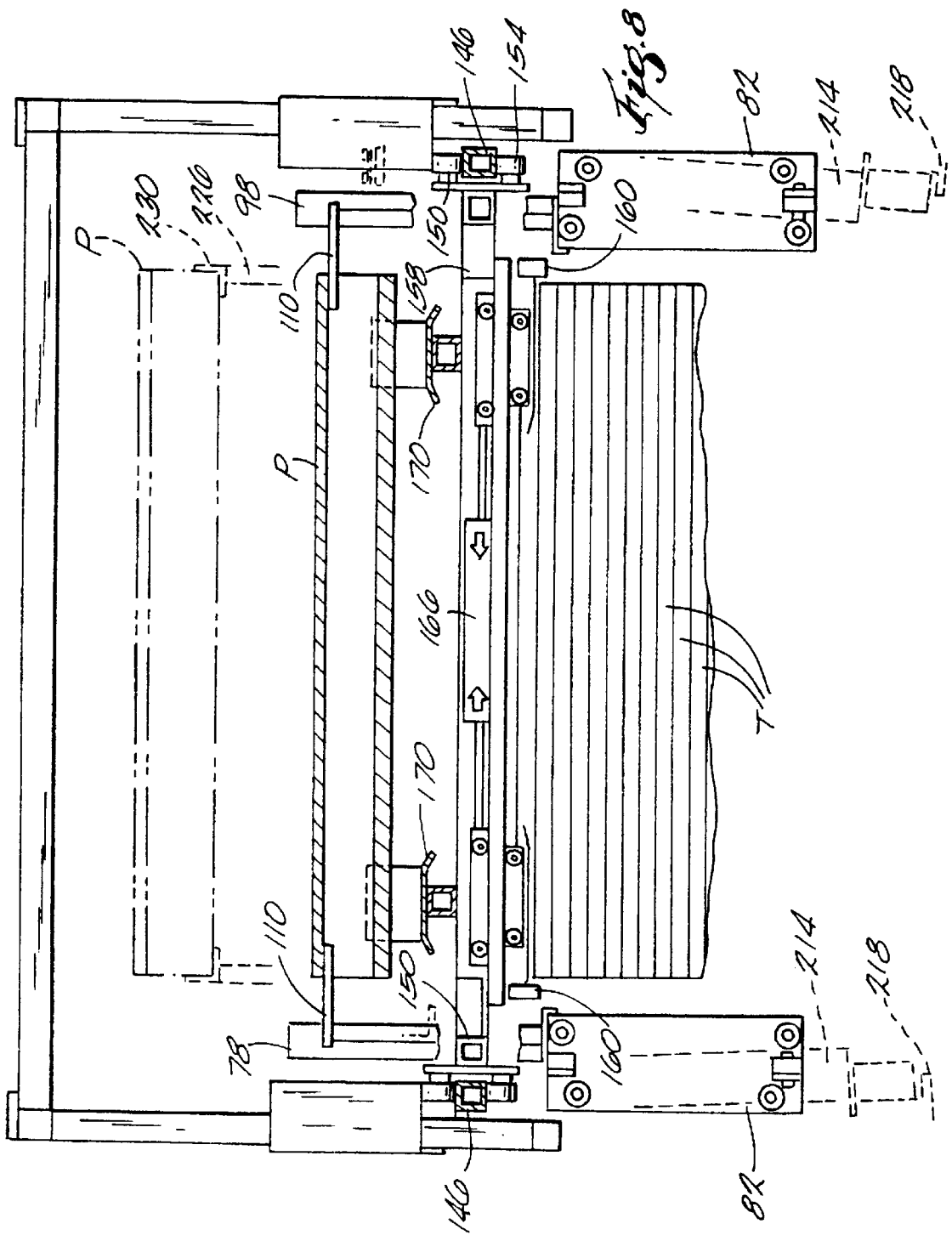
FIG. 8 is view taken generally from line 8—8 in FIG. 7.
Figure 9:
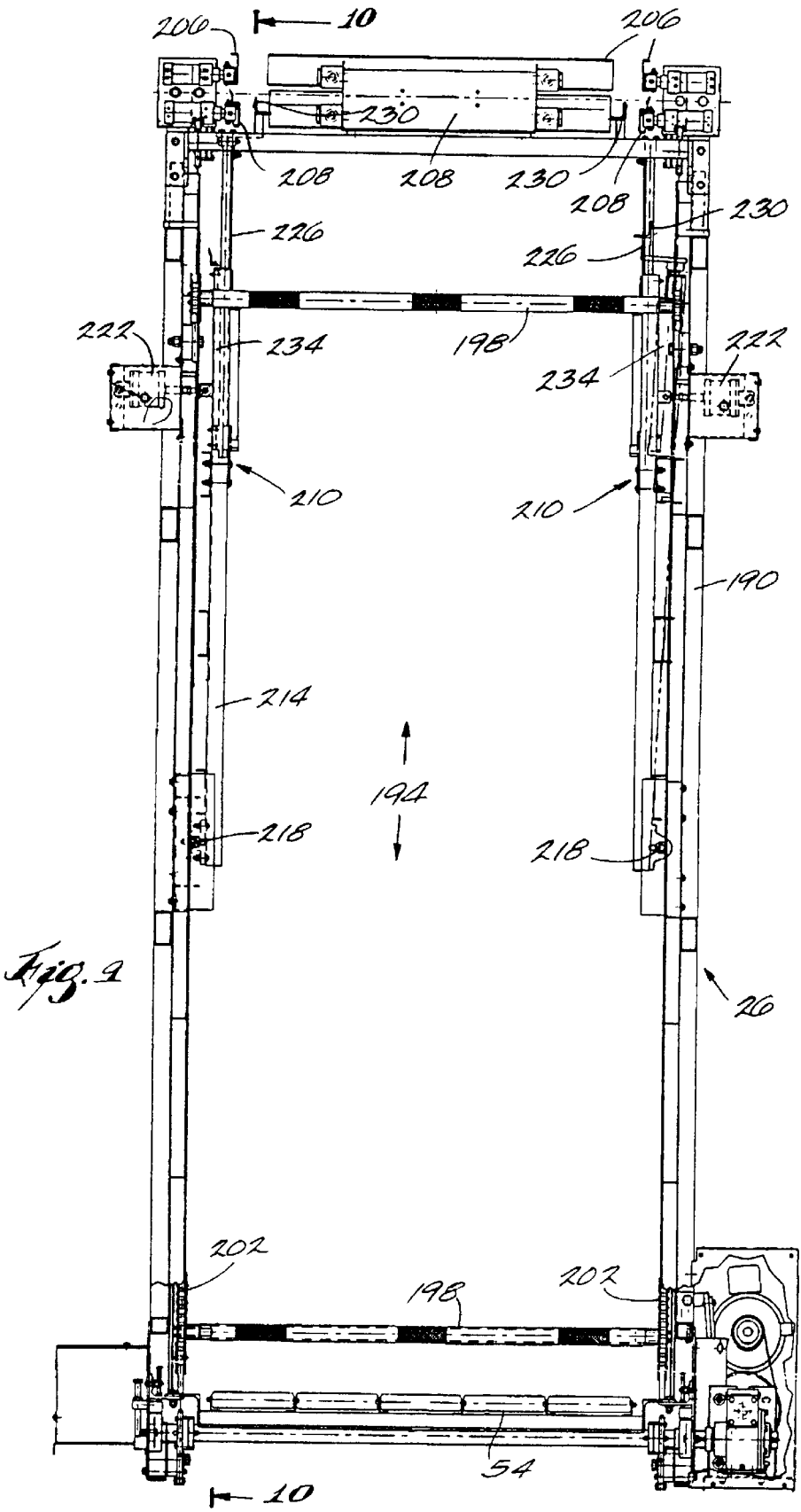
FIG. 9 is a view of the main hoist taken generally along line 9—9 in FIG. 2.
Figure 10:
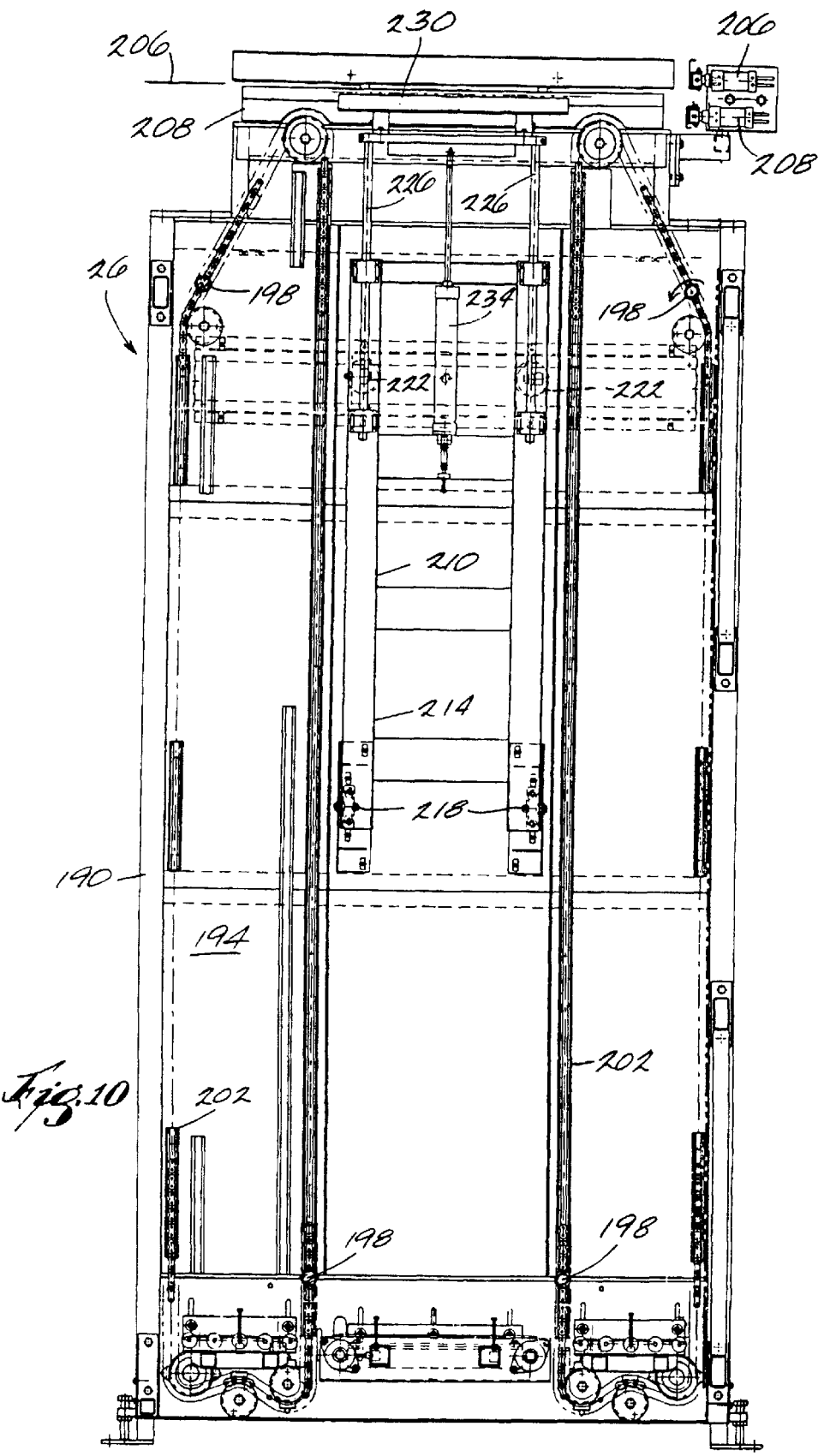
FIG. 10 is a sectional view taken generally along line 10—10 in FIG. 9.
Figure 11:
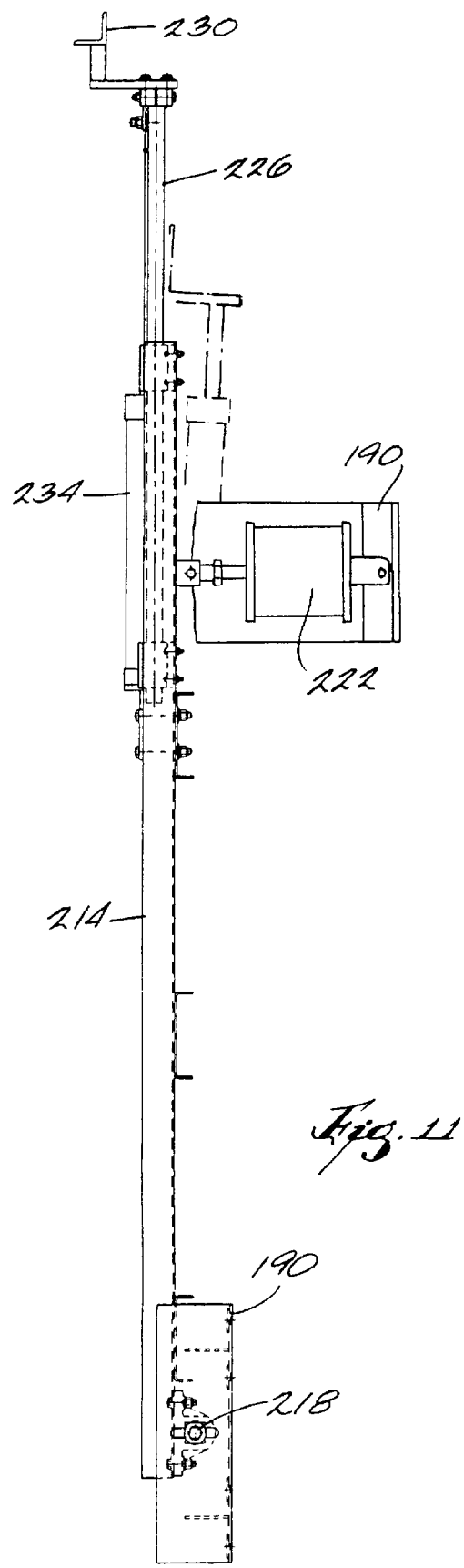
FIG. 11 is an enlarged view of a portion of the main hoist shown in FIG. 9.
Figure 12:
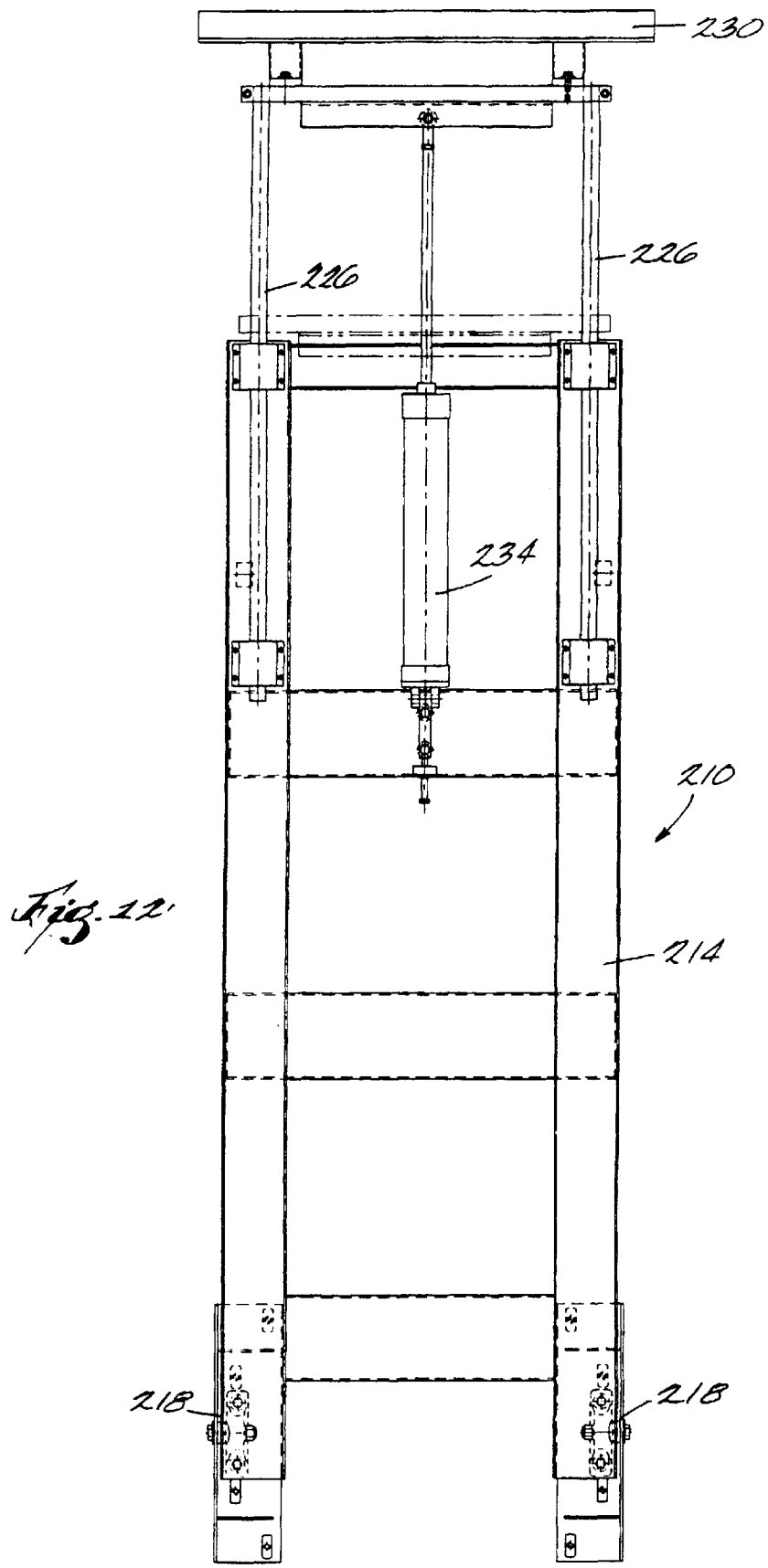
FIG. 12 is a front view of the portion of the main hoist shown in FIG. 11.

The top frame handler 42 also includes (see FIG. 8) a pair of spaced apart parallel rails 146 which extend along the upper extent of the top frame dispenser lift assembly 134 and the pallet hoist frame 74. As shown in FIG. 8, the rails 146 are spaced slightly outside the arms 98 of the pallet lift assemblies 82.

Figure 7:
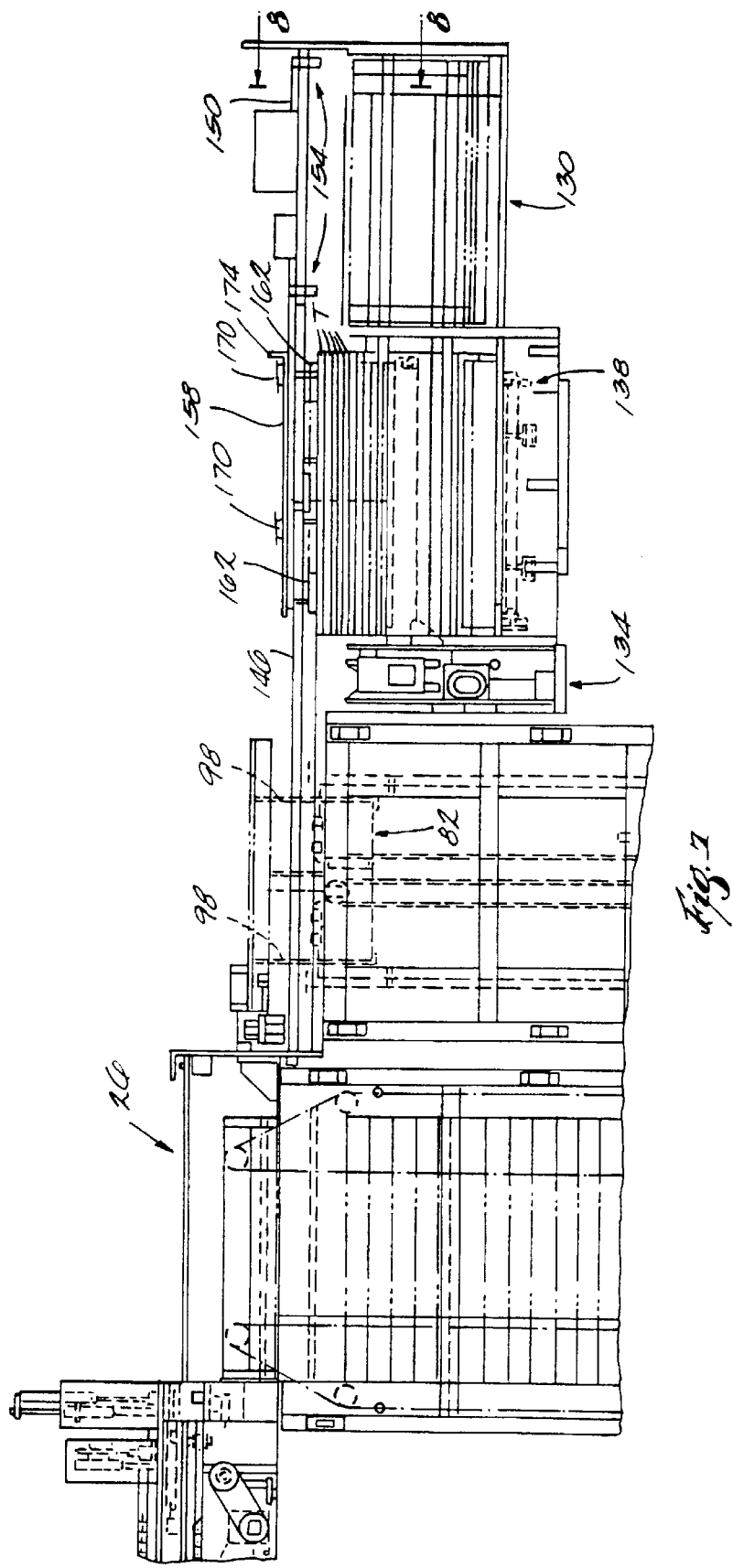
FIG. 7 is a side elevation view of the palletizer shown in FIG. 1 with various components removed to illustrate the top frame handler and pallet hoist.

The top frame handler assembly 42 also includes a carriage 150 which is supported for reciprocating movement along the rails 146 by four pairs of rollers 154 (two pairs shown in FIG. 7 and two pairs shown in FIG. 8). Each pair of rollers 154 includes a respective roller located on opposite sides of a rail 146. The carriage 150 is selectively and reciprocally driven by a belt drive (not shown) along the rails 146.

The carriage 150 is movable through a range of positions along the rails. The carriage 150 is in an initial position when it is in an extreme position directly above the top frame dispenser conveyor 130 (to the far right in FIG. 7). The carriage 150 can be driven to an intermediate position (to the left in FIG. 7) wherein the carriage is approximately above the top frame lift assembly 134 and, as discussed below, the carriage is positioned to receive a pallet held in the staging position by the pallet hoist 34. The carriage 150 can then be driven to a second extreme position, or discharge position, wherein the carriage 150 is located over the pallet hoist 34 and extends into the main hoist 26 so that a top frame can be released into the main hoist 26.

The top frame handler 42 includes a carrier 158 extending from the carriage 150 in a cantilevered manner from the carrier in a position between the rails 146. When the carriage 150 is located in the initial position (see FIG. 7), the carrier 158 extends into a position immediately over the top frame dispenser lift assembly 134. The carrier 158 is somewhat narrower than the carriage such that the lateral edges of the carrier 158 can be (FIG. 8) located between the arms 98 of the pallet hoist 34. More particularly, when the carriage 150 is advanced into the intermediate position, the carrier 158 is directly above the pallet hoist frame 74, can be moved into position located immediately below the lower surface of a pallet suspended by the pallet lift assembly 82 in the staging position disclosed above. When so positioned, the carrier is located between the arms 98 and thereafter receives a pallet suspended by the fingers 110 in a manner discussed below.

The carriage 150 also includes four top frame clamps 162 mounted on the carrier 158. Each clamp 162 includes opposing clamp members 160. The clamps 162 are arranged on the carrier 158 such that respective pairs of clamps 162 are located adjacent each rail 146 on opposite sides of the carrier 158 and are spaced apart so as to receive there between a top frame. The clamp members 160 extend downwardly from the carrier 158 and, when the carriage is in the initial position, the clamp members 160 are engageable with the lateral edges of a top frame supported by the top frame lift assembly 134.

The carriage 150 also includes a clamp actuating assembly 166 on the carrier 158 for selectively moving the clamps in unison closer together and farther apart so as to engage and release a top frame. The top frame dispenser lift assembly 134 can be indexed upwardly so that the uppermost top frame is located between the clamps 162 and the clamp actuating assembly 166 closes the clamps 162 to clasp therebetween the uppermost top frame.

In order to support a pallet thereon, the upper surface of the carriage includes a pair of pallet supports 170 and a pallet stop 174.

The top frame handler operates as follows: when in the initial position (shown in FIG. 7) the carrier 158 picks a top frame from the top frame lift assembly 134. The carriage 150 then moves along the rails 146 from the initial position toward the pallet hoist 34 (to the left in FIG. 7). When the carriage moves along the rails 146, the carrier 158 carries a top frame from the top frame dispenser lift assembly 134. The carrier moves into position immediately below a pallet suspended in the staging position by the pallet lift assemblies 82.

When the top frame handler is located in the staging position, the pallet lift assembly 82 is operated so that the fingers 110 rotate into the retracted position, thereby dropping the pallet from the pallet lift assembly 82 onto the pallet supports 170. The pallet and top frame are thereafter carried by the carrier 158 into the main hoist 26 and, once the pallet lift assembly 82 is in a retracted position, the pallet lift assembly indexes downwardly in the manner discussed above, to provide clearance to the carriage to advance along the rails 146 toward the main hoist and the discharge position.

FIGS. 9–12 illustrate the main hoist 26. The main hoist 26 is located adjacent the pallet hoist 34 and is configured and operable to receive a top frame and pallet carried by the top frame handler 42. More particularly, the main hoist 26 includes a main hoist frame 190 defining an interior space or main hoist shaft 194.

The main hoist 26 also includes a plurality of flight bars 198 (two pairs of flight bars 198 shown in FIG. 10) extending across the main hoist shaft 194. The flight bars 198 are supported at their respective opposite ends by chain belt drives 202 which are operable to move the flight bars 198 from a position adjacent the upper extent of the main hoist frame 190 to a lower position adjacent the complete stack conveyor 54. The flight bars 198 are selectively indexable by the chain belt drives 202 so as to support a pallet and to move incrementally downwardly so that the pallet is positioned to receive subsequent layers of objects from the container conveyor assembly 14 and the forming and sweeping apparatus 18 and 22. In this regard, the main hoist 26 also includes an upper square assembly 206 and a lower square assembly 208 mounted on the upper extent of the main hoist frame 190 for assuring the proper arrangement of containers once a layer of containers is moved onto a pallet.

The main hoist 26 also includes (FIGS. 10–12) a pair of pallet lift subassemblies 210 which operate in unison for removing a pallet from the pallet supports 170 on the top frame carrier 158. Each pallet lift subassembly 210 includes a frame 214 having a lower end 218 pivotally supported by one side of the main hoist frame 190. Each pallet lift assembly 210 also includes a tip cylinder 222 mounted to the main hoist frame 190 and operably connected to the frame 214. When the tip cylinder 222 is retracted (as shown in phantom in FIGS. 9 and 11), the frame 214 is substantially coplanar with the main hoist frame 190. When the tip cylinder 222 is extended, however, the frame 214 pivots about the hinge 218 inwardly of the main hoist shaft 194 such that the upper extent of the frame 214 is located inwardly of the main hoist shaft 194 relative to the lower end 218.

Each pallet lift subassembly 210 also includes (FIGS. 10 and 12) a pair of extension arms 226 telescopically received by the upper end of the frame 214. Extending between the respective distal ends of the extension arms 226 is an "L" bracket 230. A lift cylinder 234 is mounted on the frame 214 and is operable to move the arms 226 and "L" bracket 230 from a retracted position to an extended position wherein the arms 226 and "L" bracket 230 are moved upwardly away from the upper end of the frame 214. When the arms 226 and "L" bracket 230 are extended, the tip cylinder also extends and the "L" bracket 230 is lifted into a position adjacent the lower square assembly 208 at the upper extent of the main hoist 26.

A notable aspect of the operation of the pallet lift subassemblies 210 is that the "L" brackets 230 converge slightly upon extension of the arms 226 because of the inwardly angled position of the frame 214 when the tip cylinders 222 are extended. As discussed below, this convergence of the "L" brackets during extension squares a pallet supported on the "L" bracket as the pallet is lifted to the upper region of the main hoist adjacent the lower square assembly 208. This squaring of the pallet upon delivery of the pallet to the top of the main hoist helps properly orient the pallet for receiving a layer of containers from the sweep apparatus 22.

The palletizer assembly 10 is operable as follows:

Assuming an initial condition wherein a pallet is supported by the main hoist 26 in position to receive an initial layer of containers from the sweep apparatus 22, a first layer of containers is swept onto the upper surface of the pallet by the sweep apparatus 22. The flight bars 198 supporting the pallet then index downwardly through operation of the chain drive belts 202 to a lowered position such that a subsequent layer of containers can be moved onto the upper surface of the layer of containers supported by the pallet. Prior to the next cycle of the sweep assembly 22 and the main hoist 26 to move the next tier of containers on top of the first tier of containers, the separator sheet handler assembly 50 places a sheet on top of the first tier of containers. The main hoist 26, sweep apparatus 22 and sheet handler assembly 50 cooperate in this manner until the pallet is positioned in the lower region of the main hoist shaft 194.

During this operation, the top frame handler 42 supports a top frame and a pallet in the staging position, i.e., the top frame and pallet are supported by the carrier 158 immediately above the pallet hoist frame 74. Once the pallet in the main hoist 26 is fully loaded, the carriage 150 is driven on the rails 146 into the discharge position such that the carriage 150 is then located over the pallet hoist frame 74 and the carrier is introduced into the upper region of the main hoist shaft 194. When the top frame handler 42 is in the discharge position, the clamp actuator assembly 166 of the top frame handler 42 releases the clamps 162 and the top frame carried by the carrier 158 drops onto the upper surface of the uppermost layer of containers in the main hoist 26.

At the same time, the pallet lift subassemblies 210 in the main hoist 26 remove the pallet from the pallet supports 170 on the carrier 158. This is accomplished by extension of the pallet lift subassemblies from the retracted position to an extended position. More particularly, the respective tip cylinders 122 move the pallet lift subassembly frames 214 inwardly so that the "L" brackets 230 engage opposite sides and the undersurface of the pallet on the carrier 158. The lift cylinder 234 is then extended to lift the pallet upward toward the lower square assembly 208. As mentioned above, this raising of the pallet on the "L" brackets tends to square the pallet as it is lifted.

Once lifted to the uppermost extent of the pallet lift subassembly, a pallet is held in position while the chain drive belts 102 index a pair of flight bars 198 into position below the pallet. The pallet lift subassemblies 210 then retract so that the arms 226 move back into telescoped relation with the frame 214 and the tip cylinders 222 retract to pull the frame 214 into planar relation with the main hoist frame 190.

Once the pallet lift subassemblies 210 are retracted, the main hoist shaft 194 is substantially cleared so that the flight bars can index downwardly.

Upon removal of the pallet from the carrier 158, the carriage 150 retracts along the rails 146 into its initialized position. While the main hoist 26 and sweep assembly 22 cycle to load a pallet with layers of containers, the top frame handler assembly 42 and pallet hoist 34 operate in the above described manner. The pallet hoist operates so that the pallet lift assemblies 82 raise a pallet from a lower region of the pallet hoist frame 74 upward into a position over the pallet hoist frame 74. The top frame lift assembly 134 indexes upwardly so that a top frame is situated between the clamps 162 on the carrier 158. The top frame is then engaged by the clamps 162 and the carrier 150 advances such that the carrier is located below the pallet supported on the fingers 110 of the pallet lift assemblies 82. Once the carrier 158 is located in this staging position, the fingers 110 on the pallet lift assemblies 82 retract and the pallet drops onto the pallet supports 170. The palletizer assembly 10 is thus returned to the assumed initial position.

Various features of the invention are set forth in the following claims.

What is claimed is:

1. A palletizer for stacking a series of items on a pallet, said palletizer comprising:

a pallet hoist for supporting a stack of pallets therein;

a top frame dispenser for supporting a supply of top frames; and a carriage movable between an initial position and an intermediate position for moving pallets and top frames from said pallet hoist and said top frame dispenser, said carriage being positioned adjacent one of said pallet hoist and said top frame dispenser when said carriage is in said initial position and said carriage being positioned adjacent the other of said pallet hoist and said top frame dispenser when said carriage is in said intermediate position, said carriage including an upper surface, a pallet support mounted on the upper surface to support a pallet thereon, a lower surface, a clamp mounted on said lower surface and a clamp actuator connected to said clamp.

2. A palletizer as set forth in claim 1 wherein said clamp actuator causes movement of said clamp to secure a top frame in said clamp.

3. A palletizer as set forth in claim 1 wherein the top frames have lateral edges and wherein said clamp is engagable with one of the lateral edges of the upper most top frame supported by the top frame dispenser.

4. A palletizer as set forth in claim 1 wherein said pallet support includes first and second pallet support members.

5. A palletizer as set forth in claim 1 wherein said palletizer includes a pair of spaced rails and said carriage includes opposite side portions having a respective roller mounted on said side portions for connection to a respective one of said rails so that said carrier is moveable in a horizontal direction between said top frame dispenser and said pallet hoist.

6. A palletizer as set forth in claim 1 wherein said clamp includes opposing clamp members adapted to move together in unison so as to engage and release, respectively, a top frame.

7. A palletizer as set forth in claim 1 wherein said top frame dispenser includes a lift assembly for indexing the supply of top frames upwardly to position the uppermost top frame between said clamp members.

8. A palletizer as set forth in claim 1 further including a separator sheet dispenser for placing a separator sheet into the main hoist.

9. A palletizer for stacking a series of items on a pallet, said palletizer comprising:

a pallet hoist for supporting a stack of pallets therein;

a top frame dispenser for supporting a supply of top frames;

a main hoist; and a carriage having an upper surface, a pallet support mounted on the upper surface to support a pallet thereon, a lower surface, and a clamp mounted on the lower surface for engaging a top frame, the carriage being movable between an initial position wherein the clamp is engageable with a top frame in the supply of top frames, an intermediate position wherein the pallet support is engageable with a pallet in the pallet hoist, and a discharge position wherein the top frame and the pallet are removed from the carriage and discharged into the main hoist.

* * * * *

UNITED STATES PATENT AND TRADEMARK OFFICE
CERTIFICATE OF CORRECTION

PATENT NO.    : 6,338,607 B1                                              Page 1 of 1
DATED         : January 15, 2002
INVENTOR(S)   : Patris E. Vincent and Brian E. Busse It is certified that error appears in the above-identified patent and that said Letters Patent is hereby corrected as shown below:

<u>Title page,</u>
Item [57], ABSTRACT,
Line 3, the word "stuck" should be -- stack --

Signed and Sealed this

Fourth Day of March, 2003

JAMES E. ROGAN
*Director of the United States Patent and Trademark Office*